United States Patent
Cirillo et al.

(10) Patent No.: US 10,244,350 B2
(45) Date of Patent: Mar. 26, 2019

(54) METHOD AND NETWORK FOR DISCOVERING A SET OF OBJECTS WITHIN A DEFINED GEOGRAPHICAL SPACE

(71) Applicant: NEC Europe Ltd., Heidelberg (DE)

(72) Inventors: Flavio Cirillo, Heidelberg (DE);
Salvatore Longo, Mantua (IT)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/576,729

(22) PCT Filed: May 28, 2015

(86) PCT No.: PCT/EP2015/061831
§ 371 (c)(1),
(2) Date: Nov. 24, 2017

(87) PCT Pub. No.: WO2016/188582
PCT Pub. Date: Dec. 1, 2016

(65) Prior Publication Data
US 2018/0176725 A1    Jun. 21, 2018

(51) Int. Cl.
*H04W 8/00* (2009.01)
*H04W 4/021* (2018.01)

(52) U.S. Cl.
CPC ........... *H04W 4/021* (2013.01); *H04W 8/005* (2013.01)

(58) Field of Classification Search
CPC ....... H04W 4/02; H04W 4/021; H04W 4/023; H04W 64/003
See application file for complete search history.

(56) References Cited

U.S. PATENT DOCUMENTS

| 8,438,156 | B2* | 5/2013 | Redstone | G06F 17/3087 707/724 |
| 2002/0026479 | A1* | 2/2002 | Aoki | H04W 4/02 709/205 |
| 2004/0080510 | A1* | 4/2004 | Inokuchi | G06F 17/30241 345/440 |

(Continued)

FOREIGN PATENT DOCUMENTS

EP    1458206 A2    9/2004

*Primary Examiner* — Dung Hong
(74) *Attorney, Agent, or Firm* — Leydig, Voit & Mayer, Ltd.

(57) ABSTRACT

A method for discovering a set of objects within a defined geographical space, wherein the objects in the set of objects match at least one predefined characteristic, and wherein object information regarding the at least one predefined characteristic is provided by different servers, includes discovering objects within the defined geographical space by a geo discovery request based on geographical coordinates; finding, from the discovered objects, a starting object matching the at least one predefined characteristic within a definable sub-space of the defined geographical space; ranking objects within the definable sub-space by increasing distance to the starting object to establish a rank; sending a query to one or more of the different servers for gathering object information regarding a first object in the rank which is located nearest to the starting object; checking whether the first object in the rank matches the at least one predefined characteristic.

15 Claims, 7 Drawing Sheets

(56) References Cited

U.S. PATENT DOCUMENTS

| | | | |
|---|---|---|---|
| 2010/0305855 A1* | 12/2010 | Dutton | H04W 4/02 701/469 |
| 2013/0073581 A1* | 3/2013 | Sandholm | G06F 17/3087 707/769 |
| 2014/0194115 A1* | 7/2014 | Yang | H04W 52/0219 455/426.1 |
| 2014/0206348 A1* | 7/2014 | Johnsson | H04W 8/005 455/434 |
| 2014/0248901 A1* | 9/2014 | Johnsson | H04W 64/00 455/456.1 |
| 2014/0357269 A1* | 12/2014 | Zhou | H04W 76/14 455/434 |
| 2015/0094097 A1* | 4/2015 | Fraccaroli | H04W 4/021 455/456.3 |
| 2016/0219398 A1* | 7/2016 | Kamensky | H04W 4/02 |
| 2016/0327293 A1* | 11/2016 | Grabowski | F24F 11/30 |
| 2017/0078863 A1* | 3/2017 | Kim | H04W 48/16 |

\* cited by examiner

_US 10,244,350 B2_

METHOD AND NETWORK FOR DISCOVERING A SET OF OBJECTS WITHIN A DEFINED GEOGRAPHICAL SPACE

CROSS REFERENCE TO RELATED APPLICATIONS

This application is a U.S. National Stage Application under 35 U.S.C. § 371 of International Application No. PCT/EP2015/061831 filed on May 28, 2015. The International Application was published in English on Dec. 1, 2016 as WO 2016/188582 A1 under PCT Article 21(2).

FIELD

The present invention relates to a method and a network for discovering a set of objects within a defined geographical space.

BACKGROUND

Nowadays the number of objects in the Internet of Things, IoT, is impressively high and it is expected to grow rapidly in the near future. Furthermore also the heterogeneity of the information about each object is increasing and wide spread in different services, e.g. geographic discovery, social network services etc. As the result, an application of the IoT, which aims to aggregate data from lower level services, has to cope with different servers. The server with the longest response time determines the overall performance. While there is no generally valid response time distribution, it can be seen that the distributions of measured response time are long tailed and thus the more servers need to be contacted, the more likely is that one of them has a long response time.

In addition, research in distributed relational databases focuses on generating query execution plans that minimize the cost of data transmission over the network, see Optimization Algorithms for Distributed Queries—PETER M. G. APERS, ALAN R. HEVNER, AND S. BING YAO. Also CPU and I/O costs are key factors to be considered when processing a distributed spatial query.

Most research in distributed spatial query processing focuses on spatial join algorithms, spatial semijoin algorithms and the use of Bloom filters for processing distributed spatial queries. However, all of those cases are using strategies that also consider attributes values associated to the geo information.

Today, mobile phones are constantly communicating with external services, e.g. cloud services. In order to minimize the impact on the network connectivity and maximize the phone performances it is always good to minimize the communication between the phone and the external services.

Applications working on the mobile phone are often using the geographic location of the phone in order to provide services. In case that such an application is aiming to aggregate information about geo-located objects from different data sources, e.g. social networks, services catalogue, search engine etc., and assuming that discovering objects based on their location is made via a geo-discovery request to a specialized server, e.g. a yellow page service, it is possible to have a situation as follows:

In the typical scenario shown in FIG. 1, the application: 1) first makes a Geo Discovery Request in order to get the full list of all the objects lying within a geographic area and 2) then sends different requests to several heterogeneous servers in order to gather information about the objects.

Assume the case that the purpose of the application is to retrieve a subset of the geo-discovered objects that are matching miscellaneous characteristics. In a naive approach the application needs to issue a certain amount of requests for each object returned by the geo-discovery request. If no optimization is applied a high number of requests can be issued affecting significantly the performance of the application and the mobile phone.

An example of an application can be a service that finds a predefined number of individuals which match a given set of attributes, e.g. music taste, and that are within a certain area, e.g. around the user. Another example applications are: movie preference for selecting a cinema venue, food preference for restaurant finding. In this scenarios the main idea is to find information related to the geographic area. The geographic area is given as a geographic scope. In addition the information to be discovered needs to be specified. The result of a geographic discovery request is all the information whose geographic location matches the geographic scope. One assumption is the uniqueness of the object ID, this means that each discovered object is uniquely identified across the heterogeneous services.

SUMMARY

In an embodiment, the present invention provides a method for discovering a set of objects within a defined geographical space, wherein the objects in the set of objects match at least one predefined characteristic, and wherein object information regarding the at least one predefined characteristic is provided by different servers. The method includes discovering objects within the defined geographical space by a geo discovery request based on geographical coordinates; finding, from the discovered objects, a starting object matching the at least one predefined characteristic within a definable sub-space of the defined geographical space; ranking objects within the definable sub-space by increasing distance to the starting object to establish a rank; sending a query to one or more of the different servers for gathering object information regarding a first object in the rank which is located nearest to the starting object; checking whether the first object in the rank matches the at least one predefined characteristic; and repeating the sending and checking steps regarding further objects in the rank and according to the ranking of increasing distance, until a minimum set of objects matching the at least one predefined characteristic is discovered.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
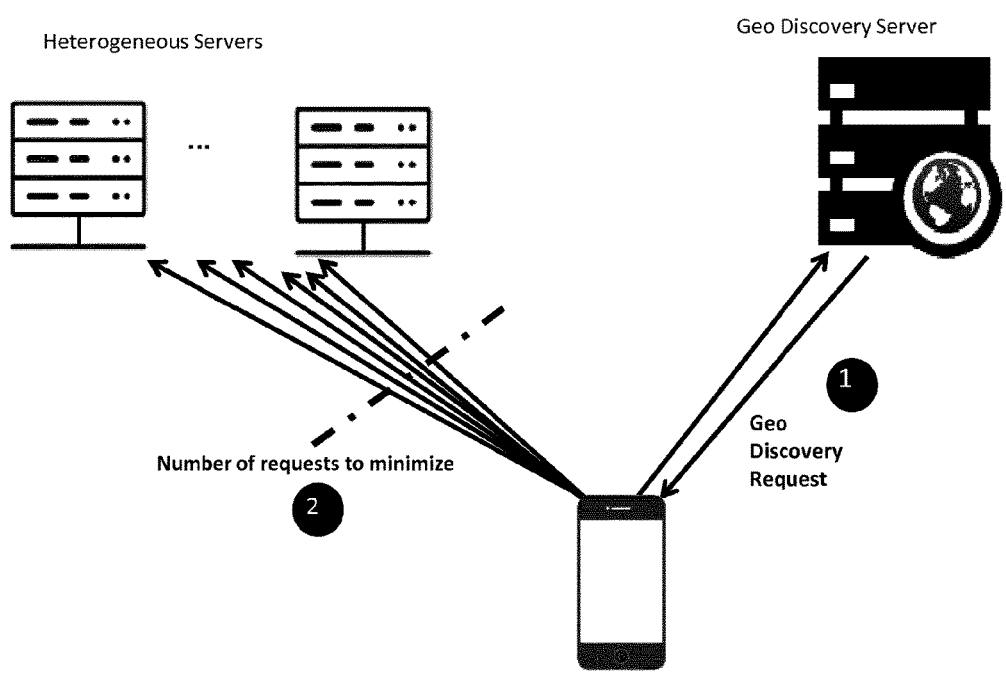
FIG. 1 depicts a typical use case of a known method for discovering objects by a computation on a mobile phone.

Embodiments of the present invention provide methods for discovering a set of objects within a defined geographical space and networks for providing an efficient discovery with a best possible reduction of network usage and/or computation time.

According to an embodiment of the invention, a method is provided for discovering a set of objects within a defined geographical space, wherein the objects match at least one predefined characteristic and wherein object information regarding the at least one predefined characteristic is provided by different servers. The method includes discovering objects within the defined geographical space by a geo discovery request based on geographical coordinates; finding, from the discovered objects, a starting object matching the at least one predefined characteristic within a definable sub-space of the defined geographical space; ranking the objects within the definable sub-space by increasing distance to the starting object within a rank; sending a query to the servers for gathering object information regarding the first object in the rank which is located nearest to the starting object; checking whether the first object matches the at least one predefined characteristic; repeating the sending and checking steps regarding the further objects in the rank and according to the ranking of increasing distance, until a minimum set of objects matching the at least one predefined characteristic is discovered.

According to an embodiment of the invention, a network is provided for discovering a set of objects within a defined geographical space, wherein the objects match at least one predefined characteristic and wherein object information regarding the at least one predefined characteristic is provided by different servers. The network includes a discovering device for discovering objects within the defined geographical space by a geo discovery request based on geographical coordinates; a finding device for finding, from the discovered objects, a starting object matching the at least one predefined characteristic within a definable sub-space of the defined geographical space; a ranking device for ranking the objects within the definable sub-space by increasing distance to the starting object within a rank; a sending device for sending a query to the servers for gathering object information regarding the first object in the rank which is located nearest to the starting object; a checking device for checking whether the first object matches the at least one predefined characteristic; a repeating device for repeating the sending and checking steps regarding the further objects in the rank and according to the ranking of increasing distance, until a minimum set of objects matching the at least one predefined characteristic is discovered.

According to embodiments of the invention, known methods and networks for discovering a set of objects within a defined geographical space can be improved by a suitable selection of object information query. A method according to an embodiment of the invention aims to discover a set of objects within a defined geographical space, wherein the set of objects can be predefined according to individual characteristics. Information regarding such characteristics can be provided by different servers to be queried. In a first step objects located within the defined geographical space can be discovered by a geo discovery request based on geographical coordinates. No attributes are associated to the discovered objects at this time of method performance. Each object could represent, for instance and without any limitation to these following attributes, persons, restaurants, or services etc.

In a next step a sub-space of the defined geographical space is selected for selecting a reduced number of object candidates to be queried regarding object information. Within said sub-space a starting object matching the at least one predefined characteristic has to be found. The starting object is one of the prior discovered objects. In a next step, the objects within the definable sub-space are ranked by increasing distance to the starting object. The ranking result is mentioned within a rank. The idea behind this ranking step is that objects being located nearby the starting object which already matches the at least one predefined characteristic, have a high chance to be similar and/or to also match the at least one predefined characteristic. Thus, the next step of sending a query to the servers for gathering object information regarding the first object in the rank which is located nearest to the starting object, will provide the chance for quickly discovering further objects which also match the at least one predefined characteristic. As a result, a quick discovery of the set of objects to be discovered is possible.

In a next step it is checked whether the first object matches the at least one predefined characteristic and the sending and checking steps are repeated regarding the further objects in the rank and according to the ranking of increasing distance, until a minimum set of objects matching the at least one predefined characteristic is discovered. Such a minimum set of objects can be a sub-set of the above mentioned set of objects to be discovered.

In summary, on the basis of the selection of objects as candidates for query to the servers for gathering object information, network usage and/or computation time can be reduced, as a set of objects to be discovered can be found very efficiently with a reduced number of queries to servers providing object information. Embodiments of the present invention can provide a kind of filter criterion, so that the number of queries to the servers can be reduced.

According to an embodiment of the invention, if no object within the definable sub-space matches the at least one predefined characteristic, a further definable sub-space can be selected for finding a starting object matching the at least one predefined characteristic. This embodiment considers the situation, if none of the objects within the definable sub-space matches the at least one predefined characteristic. In this case, a further definable sub-space can be selected for finding the suitable starting object. If also the further definable sub-space does not comprise a suitable starting object, further definable sub-spaces can be selected, until a sub-space is found which comprises a suitable starting object matching the at least one predefined characteristic.

According to a further embodiment a spatial clustering approach can be used for defining the sub-space or sub-spaces. Such a clustering approach can result in a sub-space comprising objects with a definable characteristic. This can provide a pre-selection of objects to be considered within the query for gathering object information.

Within a further embodiment the definable sub-spaces can be defined based on the height of density of objects within the sub-space. Such sub-spaces can provide a high ratio between number of objects and its geographical area. An effective discovering method can be performed under consideration of such high density sub-spaces, as the probability for discovering suitable objects is generally higher than in sub-spaces within lower density of objects.

According to a further embodiment the definable sub-spaces can be sorted by the height of density of objects within the sub-spaces. Such a sorting or ranking of sub-spaces can be suitable, if the method needs to perform the discovering procedure within more than one sub-space.

Thus, within a further embodiment, the sub-space with the highest density of objects within this sub-space can be selected as the first sub-space for finding the starting object. This will result in a high probability in successfully finding the starting object due to the high number of objects within the area of the sub-space.

According to a further embodiment the definable sub-space or sub-spaces can be a circle or circles with an object as a center and a distance between said object and a user position as a radius of said circle or circles. Such a circle approach provides a simple possibility in defining a sub-space or sub-spaces.

According to a further embodiment, if no object within the definable sub-space matches the at least one predefined characteristic, the sub-space or sub-spaces being closest to the definable sub-space and/or the sub-space or sub-spaces with the next height of density of objects can be iteratively selected for finding a starting object. Thus, two criteria can be used for selecting a sub-space or sub-spaces in case of no matching object. These criteria can be used in combination or separately.

Alternatively or additionally, if the minimum set of objects matching the at least one predefined characteristic is not discovered within the definable sub-space, the sub-space or sub-spaces being closest to the definable sub-space and/or the sub-space or sub-spaces with the next height of density of objects can be iteratively selected for further discovering. Thus, multiple sub-spaces can be used for reaching the definable minimum set of objects matching the at least one predefined characteristic, so that this minimum can be reached at the end of the method.

Some of the steps of various methods according to embodiments of the invention can be provided within a functional entity according to further embodiments. Such a functional entity can be provided for receiving the geo discovery request by a user, for transmitting the geo discovery request to a geo discovery service and for sending the query for gathering object information to the servers. Thus, such a functional entity can be provided between a user device, a geo discovery service and the servers. Such a functional entity can be designated as Core Dispatcher Engine. Such a functional entity can be integrated in known methods and networks for providing the invention.

Within a further embodiment the functional entity can be provided in a cloud or in a user device. Such a provision within a user device can minimize the network traffic between the device and the servers.

Within a further embodiment and for providing a reliable gathering of object information the objects can be uniquely identifiable by the servers. Alternatively or additionally the objects can be characterized by an object type and/or by individual geo coordinates. Thus, a reliable identification of objects is possible easily.

Within a further embodiment a geo discovery service handling the geo discovery request can only provide geo spatial information of objects. No further attributes can be associated to the objects.

Within a further embodiment the set of objects can comprise a predefined number of objects. Such a number can depend on individual requirements of an application to be performed by a user device or by a user.

Embodiments of the present invention define efficient methods for discovering a set of objects within a geographic area, matching specified characteristics, from multiple and heterogeneous data sources. An important goal is the query optimizations over the network where it tries to minimize the number of requests to heterogeneous servers for a spatial query. In order to limit the number of requests involved in the discovery operation, a selective criterion—filter—according to how the objects could be distributed, is used. Based on the retrieved object from the geo query, the filter can be applied in order to minimize the number of queries to serve the set of objects requested.

Embodiments of the present invention present mechanisms to efficiently discover a set of objects within a geographic area, matching characteristics specified as input. An assumption can be that the information is not fully centralized in a single server but distributed among heterogeneous servers. This means that a single request should involve multiple servers to be served.

Embodiments of the present invention can reduce a number of requests to external servers relying on the following assumption: "Objects that are nearby have a high chance of being similar". This approach constitutes a solution that in many cases helps to reduce the number of queries needed to determine a set of similar objects.

Various advantages of embodiments of the invention can include:
1) Reducing the number of spatial query results based on the assumption that objects that are nearby have high chances to be similar—filter approach.
2) Using the minimum distance technique for identifying which object should be queried first.
3) Reducing the amount of information that should be stored inside the Geo Discover server.

Methods according to embodiments of the invention can include one or more of the following steps:
1. A first step, for serving the user request, of identifying the entire space of objects around him, where around him means all the objects of a certain type inside a specified geographical area.
2. A second step of selecting a number of objects within the high density space. In this case techniques like clustering can be applied.
3. A third step of selecting the right object to be queried inside the cluster. In this case a filter approach can be applied in order to reduce the number of queries to the heterogeneous servers.

Further advantages of embodiments of the present invention in contrast to current state of the art can include the following. The current state of the art always considering a case where there are attributes associated to the spatial information. In all the cases the geo information and the attributes are handled by the same service. As also described in the paper Multiple-Site Distributed Spatial Query Optimization using Spatial Semijoins, by Wendy OSBORN and Saad ZAAMOUT, most of the current algorithms for spatial query focus more on the usage of spatial join and semijoin for the spatial queries in a centralized and a distributed environment, but in all the cases the attributes are always associated with the geo information. The filter approach according to embodiments of the present invention can query multiple heterogeneous servers using less queries and obtain valid/similar results.

Embodiments of the present invention can assume one or more of the following:

1) Information is not centrally stored but distributed among different servers. This means that the servers are heterogeneous. Querying the servers is expensive because of the large amount of bandwidth consumed and the high computational cost.
2) Every object has a unique ID and the ID is shared among the different servers.
3) The geo discovery query will be based only on geographical coordinates.
4) The amount of objects requested is limited.

Figure 2:
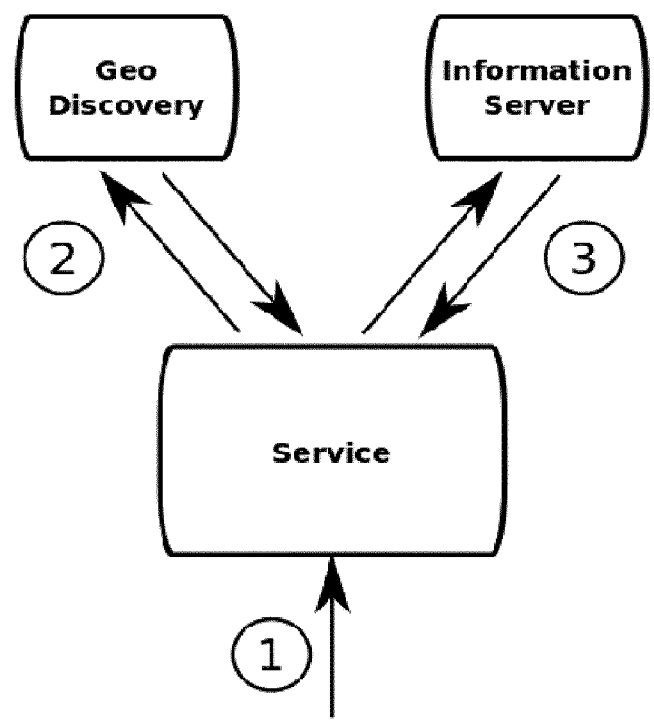
FIG. 2 depicts a generic scenario model for providing an embodiment of the invention.

Generalizing the model starting from the example of FIG. 1, it is possible to provide something like FIG. 2. The Geo Discovery service is specialized and dedicated to handle only geo spatial information of objects and it can be queried to retrieve all objects inside a geographic area. The response of this service is a list of objects.

The Information Server in FIG. 2 abstracts the many heterogeneous servers. This server can be queried to get information only about one single object. Querying the Information Server is very expensive.

Using a naive approach the objects should be queried one by one, picking an object randomly from the set returned by the Geo Discovery service.

Requirements of the problem:
1) Reducing the amount of network usage during the message exchanges between the different components.
2) Reducing time of computation for handling a complete query.

Embodiments of the invention define a methodology that in several cases can reduce the amount of requests to be issued to the Information Server.

Figure 3:
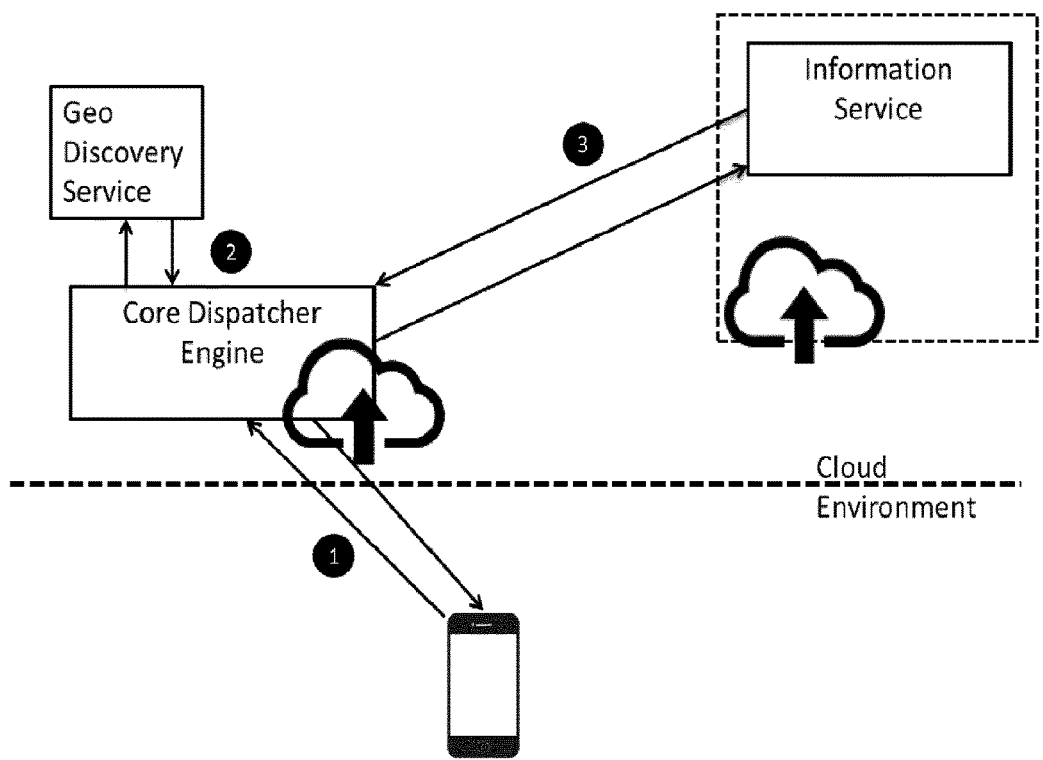
FIG. 3 depicts an architecture of an embodiment of the invention with an additional functional entity.

FIG. 3 shows the architecture and the message flow of a proposed solution according to an embodiment of the invention.

A functional entity in, for example, the form of a Core Dispatcher Engine can be considered as a main component that implements an embodiment of the present invention. In order to achieve the number of requested objects the dispatcher will perform the following actions:
1. Receive the Geo Request from a Client Application
2. Query the Geo Discovery
3. Apply the invention before to query the Information Service This component could be part of the Backend in the cloud. The Core Dispatcher Engine could be also embedded inside the fronted devices in order to minimize the network traffic between the single device and the Information Services.

The procedure to follow in order to solve the presented problem, applying a method according to an embodiment of the invention, is the following:
1. Identify the entire space of objects within a geographical area.
2. Select the number of objects within the high density space. In this case techniques like clustering can be applied.
3. Select the right object to be queried inside the cluster. In this case the filter of this invention will be applied in order to reduce the number of queries to the heterogeneous servers.

Figure 4:
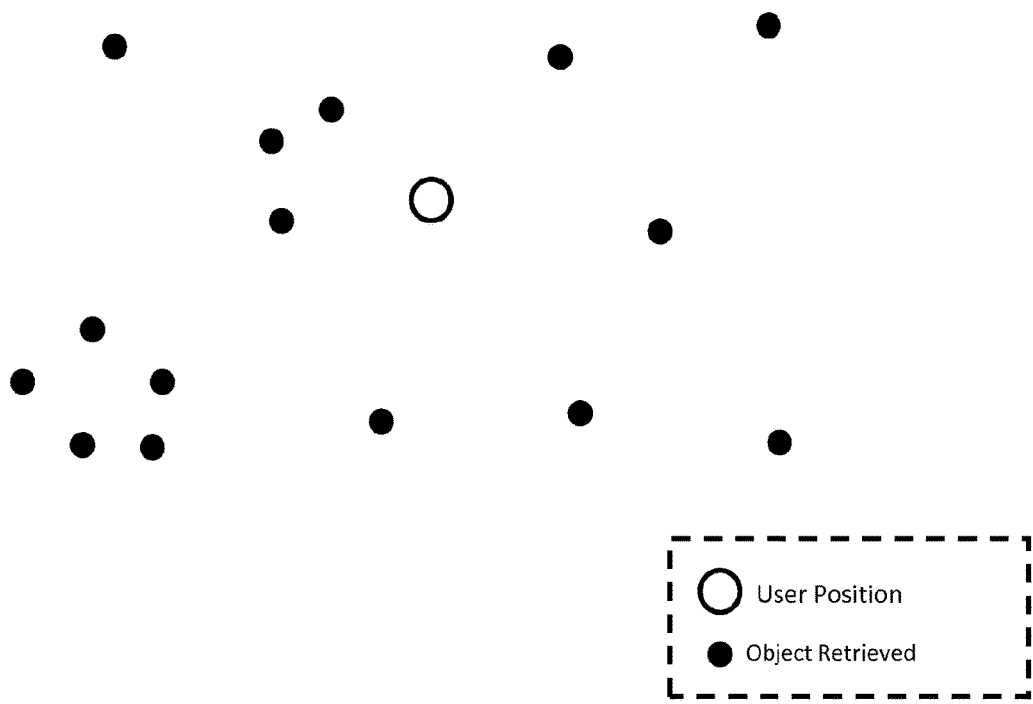
FIG. 4 depicts an example of the location of retrieved objects from a geo discovery server.

FIG. 4 shows the objects retrieved after the first step, i.e. Geo Discovery. The objects according to an embodiment have the following properties:
Unique ID across multiple servers, e.g. mobile number, email, google ID, apple ID etc.
Object Type: the type that describes the object, could be link to a semantic description.
Geo Coordinates: used for localizing the object inside the Geo Space.

No attributes are associated to the objects. Each object could represent for instance persons, restaurants, or services etc., but without limitation to this object types.

Embodiments of the present invention can define a technique for querying an external server that has information about the object attributes and retrieving a set of objects with the minimum number of queries based on the assumption that "Objects that are nearby have a high probability of being similar".

A preliminary step of an embodiment of a proposed technique is to find a first full matching object with the characteristics requested by the user. In the following description, it will be shown a methodology for selecting the set of objects to be queried. In fact, the "circle approach" is only an example and several spatial clustering approaches, see Spatial Clustering Methods in Data Mining: A Survey Jiawei Han, Micheline Kamber, and Anthony K. H. Tung. Geographic Data Mining and Knowledge Discovery, Research Monographs in GIS, Taylor and Francis, (2001), can be used for selecting the number of candidate objects.

The spatial query returns a set of objects around the initial point, i.e. user position. The next step is to find a first full matching object among the set of objects. One approach is to draw around each object a circle where:
Each object is the center of the circle.
The radius of each circle is the distance between the object and the user position.

Figure 5:
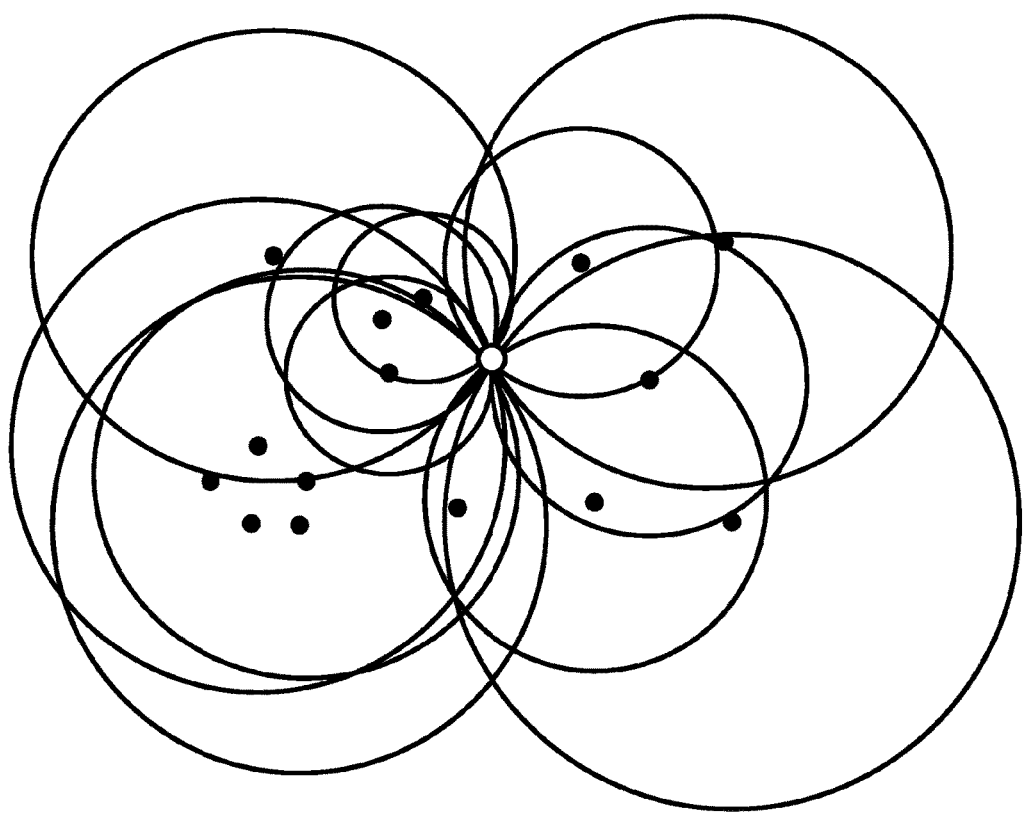
FIG. 5 depicts a partition in sub-spaces based on circles.

Based on this space partition, as shown in FIG. 5, a next action is to sort the circles by the ratio between number of objects and its area and select the first candidate with the highest ratio, i.e. highest object density.

Starting from the first candidate, a query to the external server is sent in order to check if the center of the circle is matching the attributes required by the user.

If the center of the circle does not match the required attributes, the second circle with highest density is selected.

If the selected object matches the required attributes then the filter is applied, see next section.

An embodiment of the filter can comprise several steps to be applied:
1. First the distance between all the objects inside the selected circle—sub-space—and the center of the circle needs to be calculated.
2. Second, the objects are ranked by increasing distance to the center of the circle. A smaller distance is higher in the rank.
3. Third step is to send a query to the Information Server about the first object in the rank and check if it matches the required attributes. This operation is repeated until the minimum set of required objects is satisfied.
4. If after having queried all the objects inside the circle the minimum set of objects that is matching the initial query is not found, than the closest circle or cluster with the highest density needs to be selected. After that the technique needs to be applied iteratively following all the previous steps.

Figure 6:
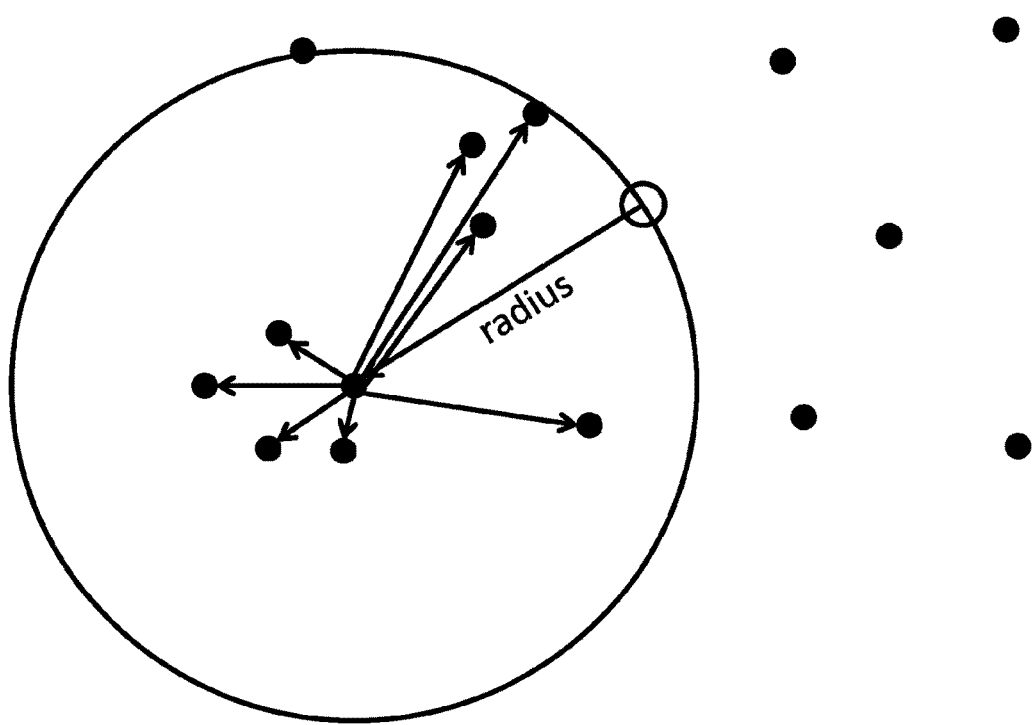
FIG. 6 depicts minimum distances between objects according to an embodiment of the invention.

FIG. 6 shows minimum distances between objects inside the selected circle and the center of the circle according to an embodiment of the invention.

Figure 7:
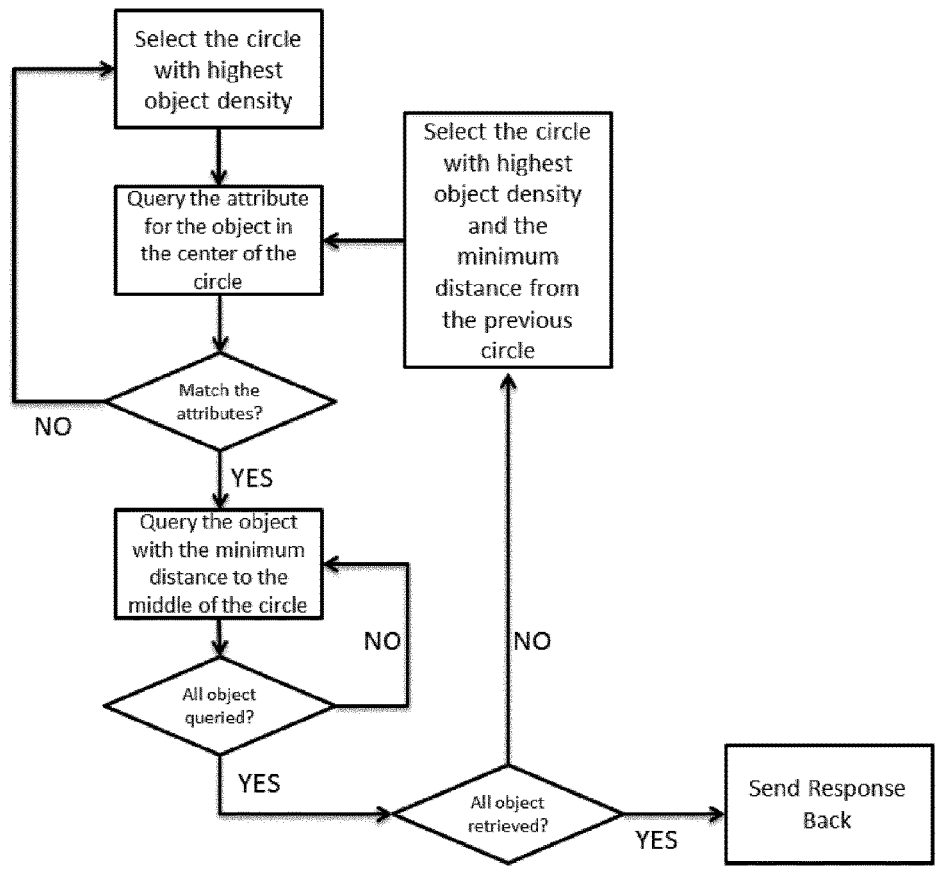
FIG. 7 depicts a block diagram of a method according to an embodiment of the invention.

FIG. 7 shows a block diagram presenting steps of an embodiment of the invention.

Extensions of the Invention: OMA NGSI 9/10 Compatibility:

The OMA NGSI 9/10 standard defines a data model for context data and operations for querying that data and subscribing to it. An embodiment of the invention can be realized in a way compatible to that standard by:

Using the NGSI 9 DiscoveryContextAvailability operation for discovering the object in a defined area.

Using the Restriction Field and more in details the OperationScope that is part of the NGSI request, it is possible to detect a set of objects that are inside a geographical area defined by geo coordinates.

Using the NGSI 10 query context Request for retrieving the Object information from the servers that are NGSI 10 compliant.

An Example of Discovery is:

```
<discoverContextAvailabilityRequest>
    <entityIdList>
        <entityId>
            <id>*</id>
        </entityId>
    </entityIdList>
    <attributeList>
        <attribute>rock</attribute>
    </attributeList>
    <restriction>
        <scope>
            <operationScope>
                <scopeType>SimpleGeoLocation</scopeType>
                <scopeValue>
                    <circle>
                        <centerLatitude>43.45</centerLatitude>
                        <centerLongitude>11.86</centerLongitude>
                        <radius>2</radius>
                    </circle>
                </scopeValue>
            </operationScope>
        </scope>
    </restriction>
</discoverContextAvailabilityRequest>
```

More information about the standard and the binding for the NGSI 10 can be found at this link:

NGSI 10: https://forge.fiware.org/plugins/mediawiki/wiki/fiware/index.php/FI-WARE_NGSI-10_Open_RESTful_API_Specification NGSI 9: https://forge.fiware.org/plugins/mediawiki/wiki/fiware/index.php/FI-WARE_NGSI-9_Open_RESTful_API_Specification While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for discovering a set of objects within a defined geographical space, wherein the objects in the set of objects match at least one predefined characteristic, and wherein object information rewarding the at least one predefined characteristic is provided by different servers, the method comprising:

discovering objects within the defined geographical space by a geo discovery request based on geographical coordinates;

finding, from the discovered objects, a starting object matching the at least one predefined characteristic within a definable sub-space of the defined geographical space;

ranking objects within the definable sub-space by increasing distance to the starting object to establish a rank;

sending a query to one or more of the different servers for gathering object information regarding a first object in the rank which is located nearest to the starting object;

checking whether the first object in the rank matches the at least one predefined characteristic; and repeating the sending and checking steps regarding further objects in the rank and according to the ranking of increasing distance, until a minimum set of objects matching the at least one predefined characteristic is discovered.

2. The method according to claim 1, wherein, if no object within the definable sub-space matches the at least one predefined characteristic, a further definable sub-space is selected for finding a starting object matching the at least one predefined characteristic.

3. The method according to claim 1, wherein a spatial clustering approach is used for defining the sub -space or sub-spaces.

4. The method according to claim 1, wherein definable sub-spaces are defined based on the height of density of objects within the sub-space.

5. The method according to claim 1, wherein definable sub-spaces spaces are sorted by the height of density of objects within the sub-spaces.

6. The method according to claim 1, wherein a sub-spaces with a highest density of objects therein is selected as the first sub-space for finding the starting object.

7. The method according to claim 1, wherein the definable sub-space is a circle with an object as a center and a distance between the object as a center and a user position as a radius of the circle.

8. The method according to claim 1, wherein, if no object with the definable sub space match the at least one predefined characteristic, a sub-space or sub-spaces being closest to the definable sub-space and/or a sub-space or sub-spaces with a next height of density of objects is or are iteratively selected for finding a starting object.

9. The method according to claim 1, wherein, if the minimum set of objects matching the at least one predefined characteristic is not discovered within the definable sub-space, a sub-space or sub-spaces being closest to the definable sub-space and/or a sub-space or sub-spaces with a next height of density of objects is or are iteratively selected for further discovering.

10. The method according to claim 1, wherein a functional entity is provided for receiving the geo discovery request by a user, for transmitting the geo discovery request to a geo discovery service and for sending the query for gathering object information to the servers.

11. The method according to claim 10, wherein the functional entity is provided in a cloud or in a user device.

12. The method according to claim 1, wherein objects are uniquely identifiable by the servers and/or are characterized by an object type and/or are characterized by individual geo coordinates.

13. The method according to claim 1, wherein a geo discovery service handling the geo discovery request provides only geo spatial information of objects.

14. The method according to claim 1, wherein the set of objects comprises a predefined number of objects.

15. A network for discovering a set of objects within a defined geographical space, wherein the objects of the set of objects match at least one predefined characteristic, and wherein object information regarding the at least one predefined characteristic is provided by different servers, the network comprising:

a discovering device for discovering objects within the defined geographical space by a geo discovery request based on geographical coordinates;

a finding device for finding, from the discovered objects, a starting object matching the at least one predefined characteristic within a definable sub-space of the defined geographical space;

a ranking device for ranking the objects within the definable sub-space by increasing distance to the starting object within a rank;

a sending device for sending a query to the servers for gathering object information regarding the first object in the rank which is located nearest to the starting object;

a checking device for checking whether the first object matches the at least one predefined characteristic; and a repeating device: for repeating the sending and checking steps regarding the further objects in the rank and according to the ranking of increasing distance, until a minimum set of objects matching the at least one predefined characteristic is discovered.

* * * * *